Aug. 1, 1961     A. QUINCHE     2,994,107
MACHINE FOR MOLDING HEADS MADE OF A THERMOPLASTIC
MATERIAL ON TUBULAR BODIES
Filed Dec. 21, 1954     3 Sheets-Sheet 1

INVENTOR.
Albert Quinche
BY
Cushman, Darby & Cushman
ATTORNEYS

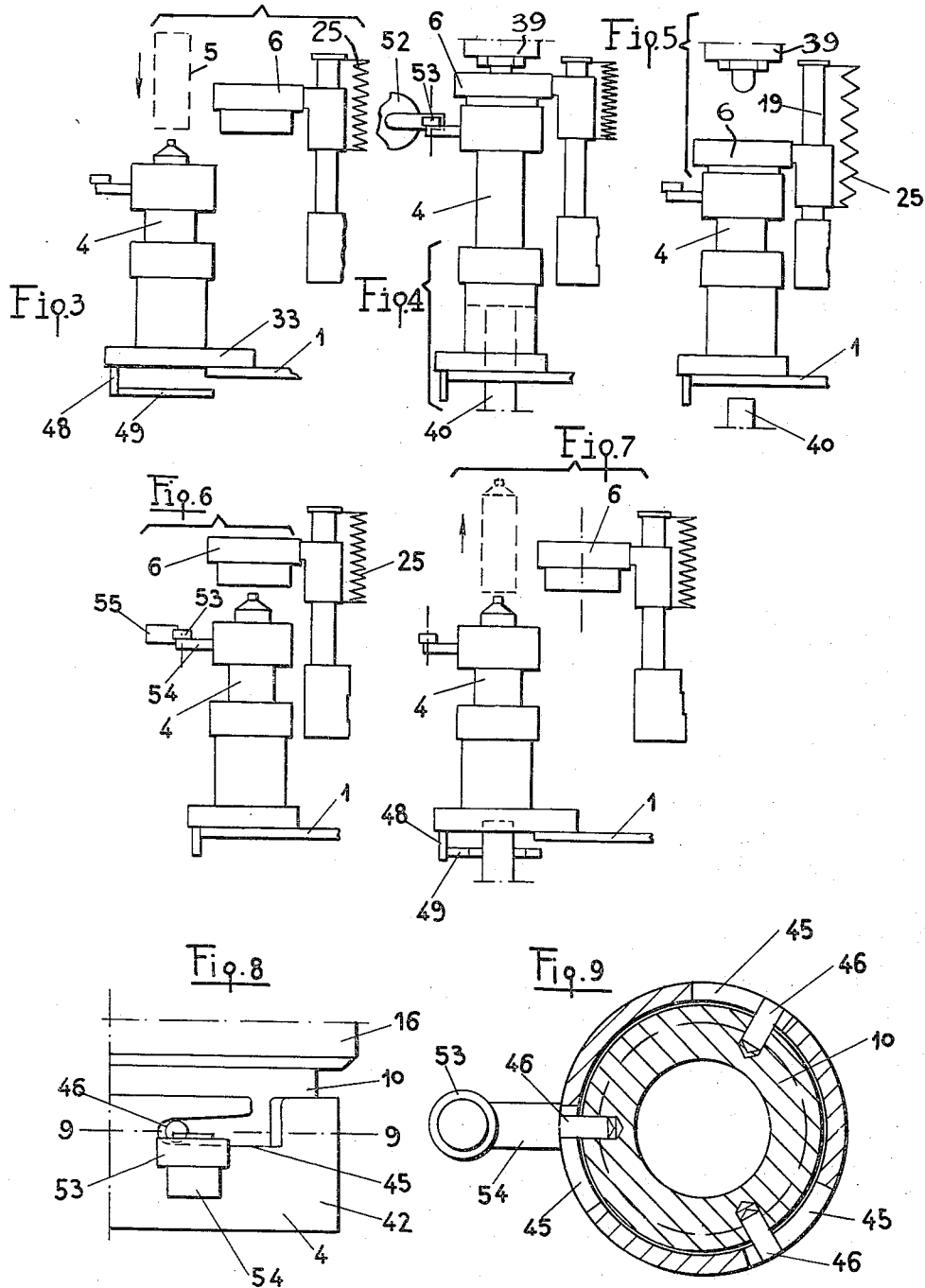

United States Patent Office 2,994,107
Patented Aug. 1, 1961

2,994,107
MACHINE FOR MOLDING HEADS MADE OF A THERMOPLASTIC MATERIAL ON TUBULAR BODIES
Albert Quinche, St. Sulpice, Switzerland, assignor, by mesne assignments, to American Can Company, New York, N.Y., a corporation of New Jersey
Filed Dec. 21, 1954, Ser. No. 476,759
Claims priority, application Switzerland Dec. 31, 1953
15 Claims. (Cl. 18—20)

The present invention relates to the art of molding thermoplastic materials such as polyethylene or the like and has for its primary object to provide a new or improved machine for molding heads made of such a material upon tubular bodies for capping the same, this machine being of the type comprising an injection head and several molds arranged on an indexing device and adapted to be presented sequentially under said injection head for being filled.

Another object of the invention is to provide a machine of the aforesaid type in which each mold is made up of a punch adapted to support the tubular body to be capped and a die having an injection duct and capable, when in mold-closing position, to cap the punch so as to clamp the end of the tubular body and to define a shaped recess adapted to receive the injected material, said punches and die being axially movable with respect to the indexing device, the molds being brought to closed position under the injection head and owing to a transient axial displacement of the punch which ensures on the one hand its insertion into the die and on the other hand the application of the latter against the injection head, means being provided for locking the die to the punch while the mold is held against the injection head so as to cause the die to follow the punch during its withdrawal and to keep the mold closed at least until the following indexing position.

A further object of the invention is to provide a machine as aforesaid of simple and sturdy construction capable of performing an automatic work under most satisfactory conditions.

With these and such other objects in view as will incidentally appear hereafter, the invention comprises the novel construction and combination of parts that will be now described with reference to the accompanying diagrammatic drawings exemplifying the same and forming a part of the present disclosure.

Figure 1:
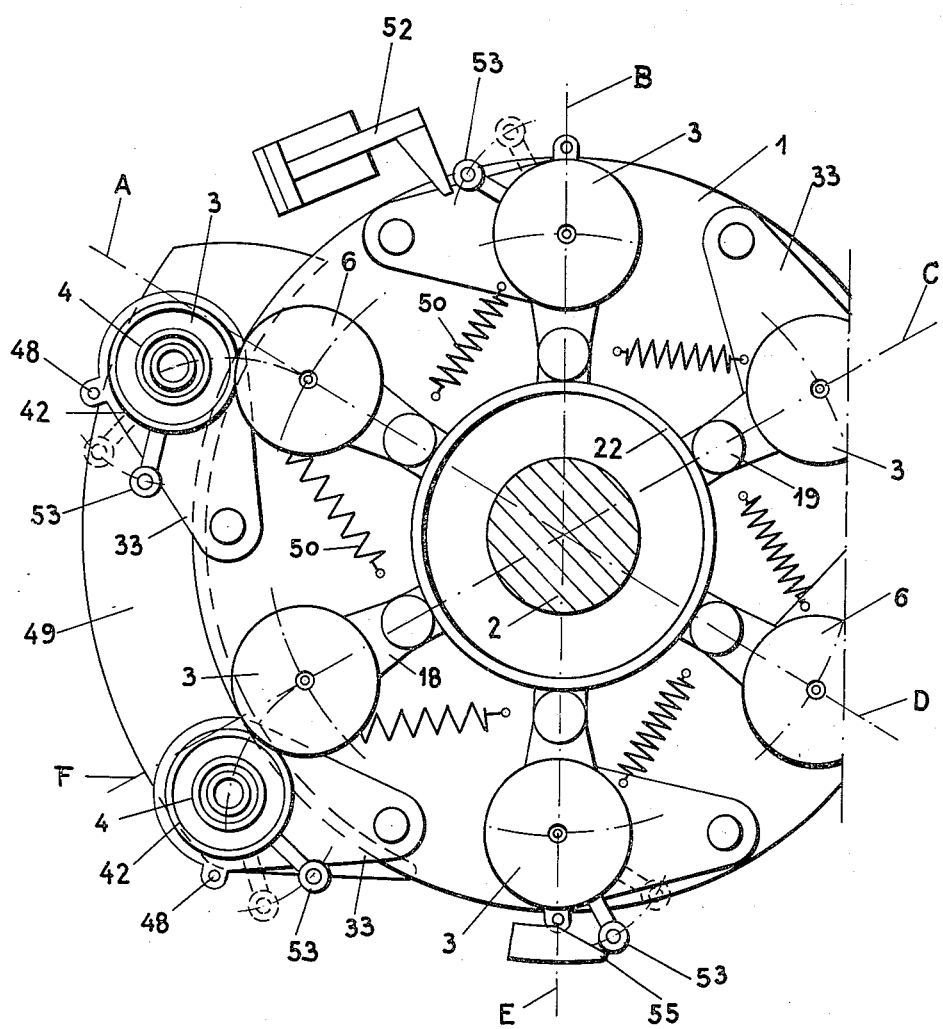
Figure 2:
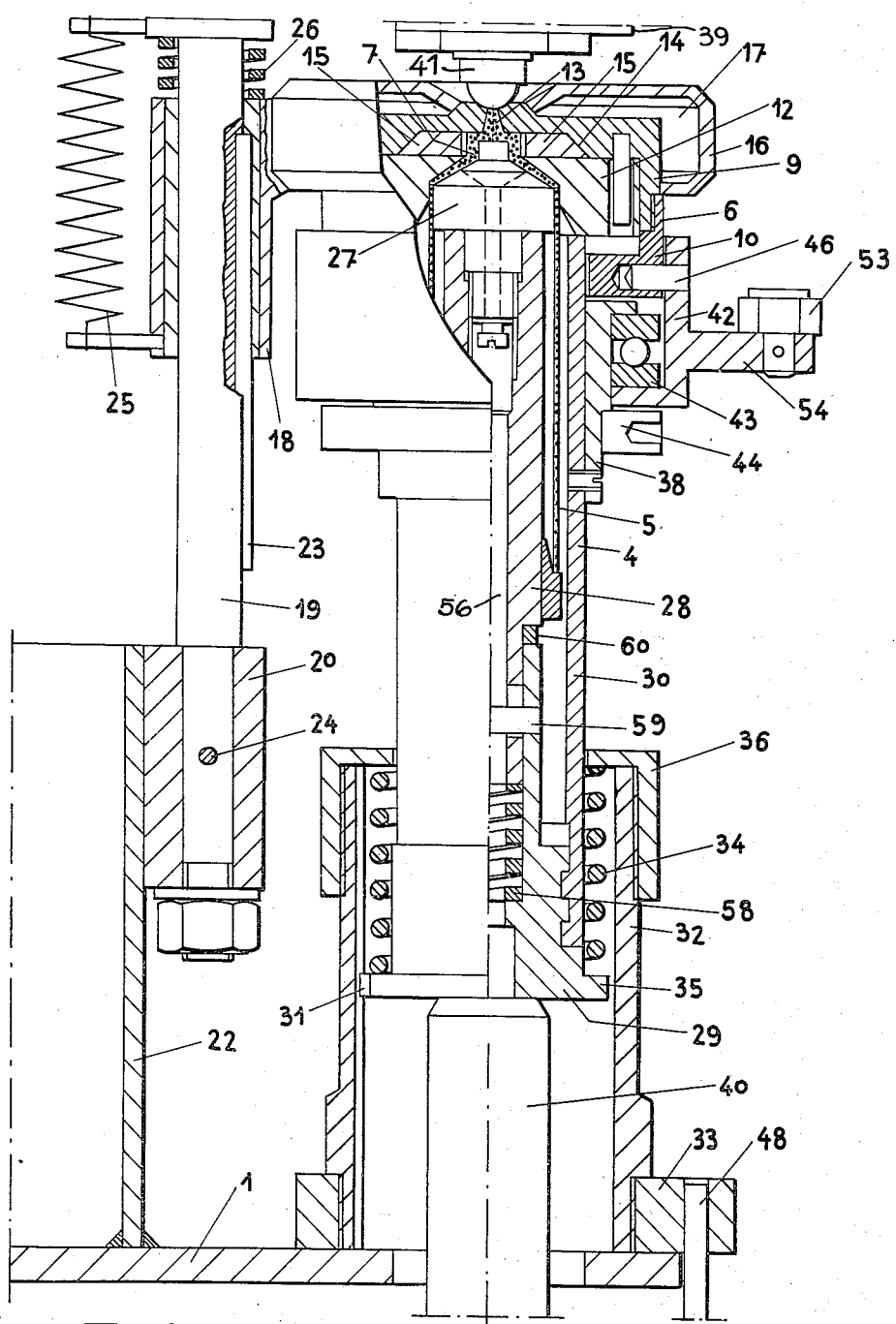

In the drawings:
FIGURE 1 is a partial plan view of the machine.
FIGURE 2 is a vertical sectional view drawn to a larger scale of the mold arranged under the injection head.
FIGURES 3 to 7 are diagrammatic representations showing the main relative positions assumed by the mold elements during an operational cycle of the machine.
FIGURE 8 is a detail view of the mold shown on FIG. 2.
FIG. 9 is a sectional view on the line 9—9 of FIG. 8.

The machine as illustrated is intended to be used for the manufacture of flexible tubes made of polyethylene and comprises a revolving plate 1 arranged for rotation on a column 2 and carrying six identical molds such as the one shown in detail in FIG. 2. These molds are evenly distributed around the axis of rotation of the plate 1 (see FIG. 1) and a driving mechanism (not shown) ensures the indexing of said plate at each sixth of the revolution for sequentially bringing the molds into each of the six positions A, B, C, D, E, F that they occupy in the showing of FIG. 1.

As illustrated in FIG. 2, each of the molds 3 includes two sections, one a punch means or assembly 4 forming a support for a tubular preformed body 5 made of polyethylene adapted to receive a head for building a flexible tube and the other a die 6 which, when the mold is in closed position, receives the upper end of the punch, whereupon the die clamps the upper end of the tubular body 5 and defines a recess 7 to be filled by the injected material.

The die 6 comprises a casing made up of two parts 9, 10 assembled by screws in which is accommodated a control element 12 slidably arranged in the casing part 9 which is formed moreover with an axial duct 13 for the ingress of the injected material and has a frusto-conical recess 14 in which are received a pair of shells 15 having a semi-circular shape in plan and slanting side faces which extend at an inclination equal to the side wall of the recess 14. When the mold is in closed position (as shown) the shells 15 forced into the recess 14 by the control element 12 are abutted against each other along their contiguous rectilinear faces in which are formed semi-circular recesses adapted to form a screw-threaded neck on the molded head.

The part 9 of the casing is received in a housing 16 defining a chamber 17 through which a cooling liquid flows and which is provided with a side lug 18 through which extends a supporting rod 19 along which the die can slide. The rod 19 has its lower end fixed to a lug 20 welded to the outer face of an upstanding annulus 22 welded in turn to the revolving plate 1, a key 23 being provided for holding the die against rotation about the rod 19 whose angular position is set by a cotter pin 24. A spring 25 to which the die is suspended urges the latter into its upper position against a spring 26 coiled about the rod 19 which forms an elastic abutment.

The punch means 4 includes a head 27 screwed upon the upper end of a tubular element 28 arranged for limited sliding motion in a base element 29 which carries a tubular pusher member 30 adapted, when the mold is in closed position, to push back the control element 12 for the die so as to hold the shells 15 for molding the screw-threaded neck in mutually clamped positions.

The punch formed as above described is slidably fitted in a socket member 32 screwed into a sole plate 33 pivotally carried by the revolving plate 1 eccentrically of the axis of the die. A helical spring 34 abutted on the one hand to a flange 35 formed on the lower end of the base element 29 and on the other hand to a cap 36 screwed upon the socket member 32 urges the punch to its lower position in which a washer 38 on the pusher member 30 is abutted against the cap 36. A rib 31 on the flange 35 holds the punch against rotation in the socket member 32.

The molds 3 are sequentially brought to the B position in opened condition i.e. when the punch 4 is in its lower position disengaged from the die 6 which surmounts the same. Under the action of a hydraulically controlled pusher member 40 arranged in front of the injection head, the punch is transiently lifted against the action of the spring 34 for being raised so as to engage the die 6 which is lifted in turn against the action of the spring 26 coiled about the rod 19 until it abuts the injection head. The latter is provided with a movable injection nozzle 41 the end portion of which has a semi-spherical shape and is push fitted into a correspondingly shaped recess in the die so that responsive to the pressure exerted by the die the nozzle is slightly raised off a seat for the injection nozzle upon which it previously rested, the mold being then in the closed position shown by FIG. 2.

This motion of the movable nozzle establishes a communication between an axial channel which is formed through it and the melting pot for the injection head from which polyethylene fluidified by suitable heating means flows under pressure into the shaping recess 7 which is filled thereby by passing through the axial duct 13 in the die.

For maintaining the mold in closed position as the pusher member 40 is withdrawn, there is provided a bayonet catch locking device which ensures fixing of the die to the punch. The device comprises a sleeve 42 rotatably mounted upon the punch washer 38 between a ball thrust bearing 43 and a holding ring 44 which is formed with three bayonet shaped notches 45 that are evenly distributed on its periphery for co-operating with radially extending pins 46 on the element 10 of the die casing (see FIGS. 8 and 9). When the punch is inserted into the die, the sleeve 42 occupies such an angular position that the pins 46 snap into the notches 45 through their mouths formed on the upper edge of the sleeve 42, a subsequent rotation of the pusher member 40 caused by a device locking the die to the punch owing to the engagement of the pins 46 under the slightly inclined upper edge of the notches 45.

The injection phase proper being described, the general operation of the machine is as follows:

When in the A position, the punch 4 which occupies its lower position is held eccentered with respect to the die 6 held in turn in its upper position by the spring 25 owing to the co-operation of a finger 48 on the base plate 33 of the punch with a stationary cam 49 (see FIGS. 1 and 3). In this position, the tubular body 5 of the flexible tube is engaged over the punch, for example by an automatic charging device.

As the revolving plate 1 is turned clockwise by one sixth of a revolution, the finger 48 reaches the end of the cam 49, whereupon the punch 4 capped by the body 5 is urged back under the die 6 by a spring 50 provided to that effect (see FIG. 1).

Therefore the mold being thus opened reaches the B position, the die and punch being thus aligned in contradistinction to the A position. When in the B position, the punch is transiently raised by the pusher member 40 as above described for closing the mold and for applying the die against the injection head.

When the punch is engaged into the die, the pins 46 snap into the notches 45 and a hydraulic control device shown diagrammatically at 52 in FIG. 1 imparts a rotation equal to about 30° clockwise to the sleeve 42, thereby locking the die to the punch. The rotation of the sleeve 42 is caused by a pusher member belonging to the hydraulic device 52 through the medium of a roller 53 fitted upon an arm 54 formed on the sleeve, said roller passing under the pusher member while the punch is transferred from the A position to the B position and being automatically set in front of the pusher member as the punch is raised (see FIGS. 2 and 4).

After the injection has lasted for enough time, the pusher member 40 is returned to its lower position thus permitting rotation of the revolving plate 1, whereupon the punch 4 falls back under the action of the spring 34, its motion being followed by the die 6 which is fastened thereto and arranged for slidable motion along the supporting rod 19. While the die goes down, the return spring 25 for said die which is weaker than the punch spring 34 is tightened and the closed mold comes to its lower position as shown in FIG. 5.

The closed mold remains in this lower position including the E position i.e. during an interval equal to three times the dwell of the revolving plate.

Shortly after its departure from the E position, a stationary cam 55 arranged in the path of the control arm 54 for the sleeve 42 imparts a counterclockwise rotation to the latter and thus frees the die 6 which soon resumes its upper position under the action of the return spring 26 (see FIG. 6).

As the mold is opened, the control member 12 for the die is released from the pressure of the pusher member 30 for the die and responsive to the action of springs (not shown) it assumes a lower position and thus liberates the shells 15 which move apart radially from each other due to the action of springs (not shown) arranged between them in recesses provided to that effect. Demolding of the screw-threaded neck portion thus takes place automatically as the die is lifted while the flexible tube which adheres to the punch remains on the latter.

As the opened mold continues its movement between the E and F positions, the finger 48 on the base plate of the punch reaches the root of the stationary cam 49 and begins to follow the same instead of remaining abutted against the periphery of the revolving plate 1 (see FIG. 1). Due to the action of this cam, the punch capped by the tube is brought to an eccentered position with respect to the die so that the tube can be disengaged vertically from the punch after the mold has reached the F position (see FIG. 7). The extraction of the tube is ensured automatically when the plate occupies said position owing to an injection of compressed air into the axial channel 56 of the tubular element 28 of the punch, the central part of its head constituting a valve which is then lifted for allowing the compressed air to penetrate into the tube which is forced off the punch.

As the punch passes from the F position to the A position, it is held in its outer position by the cam 49, whereupon the operative cycle repeats itself with a new tubular body 5 fitted upon the punch at A.

It was found, when manufacturing flexible tubes made of polyethylene by means of the machine as shown, that the time required for stabilizing the molded head is twice or three times longer than that which is necessary for the injection proper during which the material injected under pressure is welded to the upper edge of the tubular body.

For a tube having a 30 millimeter diameter, and a wall thickness comprised between 4 and 8 tenths of a millimeter and a head thickness equal to 1.2 millimeter, the injection and stabilization times are respectively equal for example to 2 to 3 seconds for the former and to 5 to 7 seconds for the latter.

This is the reason why on the machine as shown, the punch and the die of each mold are held upon each other in interlocked relation until the mold moves from the E position i.e. during a time interval equal to about three times the dwelling time of the revolving table. Owing to this fact, the advance rhythm of the revolving table may be adjusted in terms of the time interval which is required for the injection, and the output of the machine may be from twice to three times higher than that of machines of the same type in which the punch is withdrawn from the die while it is still under the injection head that is to say after a time interval equal to at least the duration of the injection plus the duration of the stabilization. The punch assembly 4 and its associated parts are pivoted as at 48 to the rotatable index device or turret in order that the punch assembly may be swung horizontally to clear the die assembly 6, so that the preformed tube 5 may initially be positioned on the tubular member 28. After the plastic head is molded to the tube, then the finished tube is ejected upon the punch assembly being moved away from the die assembly. Manifestly, other suitable means may be provided for imparting relative movement to the die assembly or the punch assembly for lodging or ejecting the tubes during the operation of the machine.

It should be noted that in the machine as shown, the mold is released from the injection head before the stabilization of the molded head has taken place and that in order to avoid any undue distortion of the molded head as the injected material shrinks following its cooling, it is advisable to provide for a permanent clamping of the molded head between the punch extremity and the bottom of the die. In the mold illustrated in FIG. 2, the clamping effect is obtained owing to the fact that the tubular element 28 of the punch is slidably mounted in the base element 29, a strong spring 58 urging it to the upper position set by a stop pin 59.

During the injection, the material under pressure pushes back the upper end of the punch as shown in FIG. 2 until it abuts a ring member 60 which rests against the end of the element 29. During stabilization, the punch head is raised again under the action of the spring 58 so as to follow up the molded head during its withdrawal and to keep the same perfectly shaped until the mold is opened.

It must be understood that the use of the machine as represented is not limited to working up polyethylene.

What is claimed is:

1. In a machine for molding heads made of a thermoplastic material on tubular bodies of the type comprising an injection head, an indexing device having several operative positions and arranged under said head, and a mold carried by said device at each indexing position, the molds being presented sequentially under the injection head, punch means including a guiding socket member carried by the indexing device, a base element slidable in said socket member, a tubular element slidable through said base element, a head on the punch means supported by said tubular element, a pusher member arranged concentrically to the tubular element and providing therewith an annular space for the tubular body which must receive the molded head, die means made up of two parts, a side lug on one of said parts, a guiding rod supported by the indexing means, said side lug being slidable upon said rod, spring means normally holding said lug in an upper abutment position, shell means radially movable in one part of the die means, a control element imparting positive radial motion to said shell means, the tubular body which must receive the molded head being clamped between said control element and the punch means head, a latch device interposed between the die means and tubular pusher member, spring means normally holding down the base part of the punch means in its lower position, a control pusher member for urging said base part upwardly for applying the die means against the injection head, and means controlling the stepwise motion of the die means and punch means from one indexing position to the next indexing position.

2. In a machine for molding heads made of a thermoplastic material on tubular bodies according to claim 1, latch means for locking the die means to the tubular pusher member for the punch means, said latch means including a pair of elements rotatably movable one relative to the other, one of said elements being carried by the die means while the other element is carried by the tubular pusher member, pins carried by one of said elements, and slots in the other element for achieving a bayonet locking action.

3. In a machine for molding heads made of a thermoplastic material on tubular bodies according to claim 1, bayonet action latch means interposed between the die means and the tubular pusher member of the punch means, said latch means including pins carried by said die means, a sleeve rotatably supported by said tubular pusher member, slots in said sleeve permitting snapping engagement of said pins, an arm on said sleeve, and means controlling the angular motion of said arm for performing the locking action or releasing the locking action between the die means and the sleeve.

4. A machine for molding plastic heads to plastic tubular bodies, including a fixed injection head, a rotatable indexing device at that side of the injection head from which softened plastic material is discharged, circumferentially spaced molds carried by said indexing device and arranged to be sequentially aligned with the injection head, each of said molds including a reciprocating punch for receiving a preformed plastic tube, a movable die between said injection head and said punch, means for moving the punch into and out of engagement with said die to open and close said mold, means in said die for forming a plastic head on the plastic tube when the punch is in engagement therewith, and means capable of displacing the individual punches relative to said dies to a degree such that straight line placing and withdrawal of a tube onto and from the said punches can be effected without die interference.

5. A plastic injection machine comprising an injection head including a discharge nozzle having a fixed location, a rotatable indexing device at that side of the injection head from which softened plastic material is discharged, circumferentially spaced molds on said indexing device arranged to be sequentially traveled through a plurality of stations and each in turn aligned with the injection head at an injection station and each having means for establishing communication with said nozzle, means to bring the communication means of the mold at the injection station into pressure contact with said nozzle, means to open each mold in response to indexing movement of said device at a mold-opening station; means for automatically locking each mold closed during injection at said injection station to retain the same in closed condition throughout the period of passage of the mold through a plurality of cooling stations after leaving said injection station, means for automatically unlocking each mold in response to indexing movement thereof on approaching said mold-opening station, and means for laterally offsetting one of the sections of each opened mold to a position out of alignment with the other section as the mold approaches the injection station from the mold-opening station to facilitate withdrawal of the molded piece, and for returning the sections to aligned condition as the injection station is reached.

6. A plastic injection machine comprising a fixed injection head including a discharge nozzle, a rotatable indexing device below said head, circumferentially spaced molds on said indexing device arranged to be sequentially traveled through a plurality of stations and each in turn aligned with the injection head at an injection station, each of said molds comprising mating upper and lower sections in which the upper section includes means for establishing communication with the nozzle, means normally holding said sections in vertically spaced open relationship, pusher means at said injection station for raising the lower mold section into mating contact with the upper section and the closed mold into contact with the injection head for introducing softened plastic thereinto, and for lowering the mold against the indexing device when injection is completed, means for automatically locking said mold sections together while held in injection position by said pusher means and for retaining the sections thus locked throughout the period of passage of the mold through a plurality of cooling stations after leaving said injection station, means for automatically unlocking each mold in response to indexing movement thereof on approaching a mold-opening station whereby said mold sections resume their open normally spaced positions, means for laterally offsetting one of said mold sections to a position out of alignment with the other mold section as the mold approaches the injection station for facilitating unobstructed straight line withdrawal of the molded piece from the opened mold, and means for returning said mold sections to aligned position as the mold reaches the injection station.

7. A plastic injection machine as set forth in claim 6 in which the means for locking the mold sections together comprises a rotary collar on one section of each pair of sections having bayonet slots engageable with radially extending pins on the other section, of each pair of sections.

8. A plastic injection machine as set forth in claim 6 in which the means for locking and unlocking the mold sections comprises a rotary collar on one of the sections rotatable in one direction to lock the sections together and in the opposite direction to release them, an operating arm on said collar, means adjacent said injection station for operating said operating arm in one direction, and means adjacent said mold-opening station for operating said arm in the opposite direction, one of said two last named means comprising a movable pusher element engageable with the arm when the mold is in predetermined position and whose movement is timed with the machine operation, and the other comprising a fixed cam against which said arm rides.

9. A plastic injection machine as set forth in claim 8 in which the means adjacent said injection station is disposed at a level to engage said arm when the mold is raised to injection position by the pusher means, and the means adjacent the mold-opening station is disposed at a level to engage said arm when the mold is in lowered position against said indexing member.

10. A plastic injection machine as set forth in claim 6 in which the means for laterally offsetting one of the mold sections acts upon the lower section to move the same farther from the axis of indexing travel than the upper section.

11. A plastic injection machine as set forth in claim 10 in which the lower mold sections are carried for vertical sliding movement in sockets which are pivotally connected to said indexing member for lateral movement in a horizontal plane, and wherein the offsetting means acts directly on said sockets.

12. A plastic injection machine according to claim 11 in which the offsetting means includes a fixed cam engageable with actuating means on each socket to offset the same out of alignment with its upper mold section for a predetermined portion of the rotation of the indexing member.

13. A plastic injection machine according to claim 6 in which one of said mold sections includes a shiftable portion urged in a direction to tend towards entrance into and reduction of the volume of the mold chamber, whereby continued forming pressure will be maintained on the plastic material within the locked mold after removal from the injection station until the material has reached a fully set condition.

14. A machine for molding plastic heads to plastic tubular bodies having in combination a fixed injection head provided with a discharge nozzle, a rotatable indexing device at that side of the injection head from which softened plastic material is discharged, circumferentially spaced sockets on said indexing device, a mold movably carried in each of said sockets and arranged to be sequentially aligned with the injection head, each of said molds including a reciprocating punch for receiving a preformed tubular plastic body, a displaceable die between said injection head and said punch, means for moving the punch into engagement with said die, means for communicating the discharge nozzle with said die for introducing plastic material into the latter, and means in said die for forming a plastic head on the plastic body when the punch is in engagement therewith, means pivotally connecting each socket to the indexing device, and means for swinging each socket to displace a said punch out of alignment with its die in order to facilitate straight line positioning and withdrawal of a tube onto and from a said punch without die interference.

15. A plastic injection machine comprising an injection head including a discharge nozzle, a rotatable indexing device at that side of the injection head from which softened plastic material is discharged, circumferentially spaced punches carried on said indexing device and arranged to be sequentially traveled through a plurality of stations, circumferentially spaced dies disposed between said injection head and said punches, each of said punches mating with one of the dies and being in axially alignment therewith at certain stations including an injection station, means for moving each punch in turn into engagement with its mating die at said injection station and for moving both to place the die in communication with the discharge nozzle for introducing plastic material into the latter, means for automatically locking the mating punch and die together while held in injection position by said punch moving means and for retaining the mating punch and die locked throughout a period of passage through a plurality of cooling stations after leaving said injection station, means for automatically unlocking the mating punch and die in response to indexing movement thereof on approaching an opening station whereupon said punch and die assume open spaced positions, means for displacing each punch in turn out of alignment with the die with which it was mated to facilitate positioning and withdrawal of a tube onto and from each said punch without die interference, and means for returning each punch into an aligned position with a die upon reaching the injection station.

References Cited in the file of this patent
UNITED STATES PATENTS

| 1,697,741 | Vaughan | Jan. 1, 1929 |
| 1,965,732 | Bisterfeld | July 10, 1934 |
| 2,027,164 | Grubman | Jan. 7, 1936 |
| 2,058,880 | Hunt | Oct. 27, 1936 |
| 2,327,227 | Tucker | Aug. 17, 1943 |
| 2,624,071 | Strahm et al. | Jan. 6, 1953 |

FOREIGN PATENTS

| 502,795 | Belgium | May 15, 1951 |
| 1,083,474 | France | Jan. 10, 1955 |